United States Patent Office 3,634,473
Patented Jan. 11, 1972

3,634,473
PROCESS FOR MANUFACTURE OF SYMMETRICAL
GLYCERIDES
James Harwood, Chicago, Ill., assignor to SCM
Corporation, New York, N.Y.
No Drawing. Filed Nov. 21, 1966, Ser. No. 595,586
Int. Cl. C11c 3/02
U.S. Cl. 260—410.7                                              7 Claims

ABSTRACT OF THE DISCLOSURE

Substantially pure symmetrical di- and triglycerides can be prepared by an improvement in a conventional glycerolysis process. The improvement resides in first liquifying a substantially anhydrous mixture of glycerol and triglyceride fat, then adding a low temperature rearrangement catalyst to the liquified mixture and agitating the catalyst-containing liquified mixture until a symmetrical diglyceride is formed by equilibration in the liquid mixture. Crystallization of the symmetrical diglyceride is induced and maintained from the liquid mixture, under agitation conditions, while maintaining the temperatures of the mixture between its liquefaction temperature and a temperature above that at which other equilibration products in the mixture will solidify or crystallize. Crystallization is induced by cooling the mixture; simultaneously seeding and cooling the mixture; or by the addition of a minor amount of suitable solvent to the mixture which is then cooled. Optionally, the solvent may be removed from the mixture as an aid in inducing crystallization. As solid symmetrical diglycerides are removed from the mixtures, re-equilibration of the residual components in the mixture takes place resulting in the formation of additional symmetrical diglycerides. The symmetrical diglycerides so obtained are then converted to symmetrical triglycerides by acylating the diglyceride in the presence of a hydrogen chloride acceptor after the inactivation of the catalyst in the diglyceride.

The present invention is concerned with the manufacture of symmetrical glycerides and, more particularly, relates to an improved process for the manufacture of symmetrical saturated diglyceride and symmetrical 2-mono-unsaturated 1,3-disaturated triglyceride products. The invention is advantageous in that it provides substantially pure diglyceride products which are useful as intermediates in the manufacture of symmetrical triglycerides which are compatible with cocoa butter. The invention further provides symmetrical glyceride produtcs which are in themselves compatible with cocoa butter.

The process of the present invention constitutes improvement in a conventional process for the glycerolysis of triglycerides in which the acyl groups are substantially saturated and contain between 12 and 22 carbon atoms. The improvement is for directing the glycerolysis of the glycerides to the production of substantially symmetrical glycerides and comprises the steps of:

(a) Liquifying a substantially anhydrous mixture containing from about 1 to about 3 mols of triglyceride per mol of glycerol by heating said mixture to a temperature not substantially above that which will liquify the mixture, (b) Dispersing from about 0.25 to about 1 weight percent of a low temperature rearrangement catalyst in said liquified mixture, (c) Agitating said liquified mixture for a time not substantially in excess of about 2 hours until a symmetrical diglyceride is formed by equilibration in said liquid mixture, (d) Inducing and maintaining precipitation of solid symmetrical diglyceride from said liquified mixture, under agitation conditions, while maintaining the temperature of the mixture between its liquefaction temperature and a temperature above that at which other equilibration products in said mixture will solidify, and (e) Recovering substantially pure solid symmetrical diglyceride. By so proceeding, solid symmetrical diglyceride product comprising a substantially pure 1,3-diglyceride containing saturated acyl groups is obtained. As will be hereinafter evident, such diglyceride products can be acylated to form symmetrical triglycerides which are compatible with cocoa butter.

A wide variety of triglycerides can be used as starting materials in the anhydrous mixture employed in the process of this invention. However, it has been found advantageous to employ triglycerides containing acyl groups which are substantially saturated and which contain between 12 and 22, preferably between 16 and 18, carbon atoms because such triglycerides from symmetrical diglycerides which more readily solidify in and can be more readily recovered from the liquified mixture. Particularly preferred triglycerides are those which contain palmitoyl and stearoyl groups or radicals such as, for example, tripalmitin, tristearin stearo-dipalmitin and palmito-distearin.

The term " symmetrical glyceride" as used herein is intended to mean and to refer to positional isomer symmetry rather than the kind or type of acyl group present. Thus, for example, a product such as 1-stearoyl-3-palmitoyl-diglyceride (sometimes referred to as 3-palmito-1-stearin) is a symmetrical (though mixed) diglyceride.

The anhydrous mixture containing the above-described triglycerides and glycerol may be formed in a variety of ways including, for example, by separately dehydrating the triglyceride and the glycerol prior to mixing or by heating the triglyceride and glycerol to a temperature above 100° C. (usually in an inert atmosphere such as, for example, nitrogen), to evaporate residual water from the glycerol (which may contain up to 6 percent water) and/or the triglyceride components of the mixture. Alternatively and preferably the anhydrous mixture is formed from previously dehydrated glycerol and triglyceride.

As noted above, the anhydrous mixture contains from about 1 to about 3 mols of triglyceride per mol of glycerol. If more than about 3 mols of triglyceride per mol of glycerol are employed in the anhydrous mixture, large quantities of triglycerides will remain unreacted in the mixture. On the other hand, if less than about 1 mol of triglyceride per mol of glycerol is employed in the mixture, an excessive amount of unreacted glycerol will remain in the mixture and substantial amounts of monoglycerides will be formed and remain in the mixture. It has been found generally preferable to employ a mixture containing about 2 (e.g. from about 1.75 to about 2.25) mol of triglyceride per mol of glycerol since such mixtures provide maximum yields of symmetrical diglyceride.

The anhydrous mixture of glycerol and triglyceride is heated to a temperature not substantially above that which will completely liquify the mixture and, as will be evident to those skilled in the art, the precise temperature employed will depend upon the triglyceride employed. For example, if the triglyceride consists substantially of tripalmitin, the liquefaction temperature of the mixture will be in the range of from about 64° C. to about 66° C. On the other hand, if the mixture contains a triglyceride, such as tristearin, the liquefaction temperature will be in the range of from about 71° C. to about 73° C. If the triglyceride consists of mixtures of tristearin and tripalmitin, the liquefaction temperature will be in the range from about 65° C. to about 69° C.

The phrase "liquefaction temperature" or "melt" is intended to mean and to include the lowest temperature at which the anhydrous mixture will completely liquify. Liquidity of the anhydrous mixture is essential in order to obtain intimate and complete contact of the catalyst with the anhydrous glycerolysis mixture and to insure equilibration within the mixture. After liquefaction of the mixture has occurred, from about 0.25 to about 1 weight percent based on the weight of the mixture of a low temperature rearrangement catalyst is dispersed in the liquified mixture, preferably by mechanical means while the mixture is maintained substantially at its liquefaction temperature. Efficient dispersion of the catalyst, in the liquified mixture, is critical in order to promote transesterification.

The low temperature rearrangement catalyst employed can be any of a wide variety of conventional rearrangement catalysts such as those described in U.S. Patent 2,442,532. However, the catalyst is preferably a metal lower alkoxide containing between 1 to 5 carbon atoms in the alkoxide group, more preferably, an alkali metal lower alkoxide, most preferably, sodium methoxide or sodium ethoxide. Such catalysts are preferred for their ease of dispersibility in the liquified mixture.

If less than about 0.25 weight percent of catalyst is employed, equilibration reaction times will be unduly prolonged. Although more than 1 weight percent of catalyst can be employed, there is no economic advantage and some difficulty may be experienced in deactivating the catalyst and removing it from the symmetrical diglyceride of the final product.

The dispersion of the catalyst in the liquid mixture is accomplished with agitation to insure contact of the catalyst with components of the mixture. After dispersion, agitation of the mixture is continued for a time not substantially in excess of 2 hours, usually between about ½ and about 2 hours, until a preponderance of a symmetrical diglyceride is formed by equilibration in the liquid mixture. The precise time employed will depend to some extent upon the amount of catalyst used, the shorter times corresponding to the higher catalyst concentrations. Unduly prolonged contact time of the catalyst with the anhydrous mixture is disadvantageous in that polyglycerol and/or esters thereof are often formed. Polyglycerol and esters thereof are undesirable in that they tend to prevent diglyceride precipitation from the melt.

During agitation, the triglyceride-glycerol mixture undergoes equilibration, that is, a metathetical reaction (e.g. glycerolysis and transesterification) takes place and the liquid mixture contains progressively greater amounts of symmetrical 1,3-diglyceride. The equilibration liquid mixture also usually contains, in addition to the symmetrical diglyceride, asymmetrical diglyceride, unreacted triglyceride, unreacted glycerol and minor amounts of symmetrical and asymmetrical monoglycerides are also often present in the mixture.

Since the temperature at which the symmetrical 1,3-diglyceride solidifies is usually higher than the temperature at which the above-mentioned components of the equilibration mixture (e.g. triglyceride, asymmetrical diglyceride, monoglyceride, and glycerol) solidify, precipitation of the symmetrical diglyceride can occur under isothermal conditions as it is formed in the liquid mixture. However, glycerides, when in solution, often tend to "super cool" (e.g. remain in liquid solution at temperatures below their crystallization temperature) and precipitation of symmetrical diglyceride from the liquid does not always occur at the expected temperature. Also, components such as polyglycerol esters are sometimes present in the mixture and when present tend to inhibit precipitation or crystallization of the symmetrical diglyceride from the mixture.

Solidification or crystallization of the symmetrical diglyceride can be induced by "seeding" the liquid equilibration mixture with a symmetrical diglyceride which has been previously prepared, or by cooling the liquid (which tends to increase in temperature during precipitation due to heat of crystallization) or by a combination of seeding and cooling.

Another method which can be used to induce crystallization of the symmetrical diglyceride from the liquid comprises adding to the liquified mixture, while maintaining the temperature constant, from about 5 to about 25 percent, based on the weight of the triglyceride, of a volatile organic liquid. The organic liquid should be one which is a solvent for all of the above-described components in the equilibration mixture and should also be non-reactive with the low temperature rearrangement catalyst. Examples of suitable liquids include high boiling ethers such as dioxane, tetrahydrofuran, tetrahydropyran, 1,2-dimethoxyethane, and the like, since these liquids are solvents for the components of the mixture and do not react with the catalyst. The solvent is preferably heated to the temperature of the liquid prior to its addition. After its addition, solidification of symmetrical diglyceride begins and the solvent is removed from the liquid during progressive solidification and precipitation of symmetrical diglyceride from the mixture. The use of the solvent in inducing precipitation of solid symmetrical diglyceride generally results in a product containing significantly higher amounts of diglycerides (e.g. 90 percent and greater than when such solvent is omitted, that is, when the solidification and precipitation is induced by cooling or seeding the reaction mixture). It is sometimes advantageous, depending upon the glyceride employed to cool the solvent-containing equilibration liquid. The solidification of the symmetrical diglyceride results in a liquid-solid phase mixture. As the symmetrical diglyceride is removed from the liquid phase, the eqilibration reaction continues and further equilibration occurs in which asymmetrical diglyceride is directed to symmetrical diglyceride by the action of the catalyst. Also, some of the aforementioned unreacted glycerol and triglyceride react to form additional mixtures of symmetrical and asymmetrical diglyceride.

The interesterification and/or transesterification reactions involving glycerol and triglyceride in setting up the equilibration reaction mixture can be represented as follows:

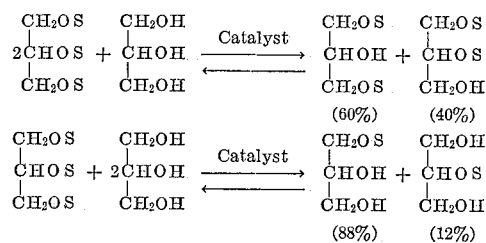

In the above formula S represents a saturated normal aliphatic acyl containing between 12 and 22 carbon atoms. The ratios of mono and diglyceride components in the glycerolysis process will depend upon the molecular ratio of glyceryl to fatty acid radicals which is present in the mixture. Thus, the equilibration mixture produced from 2 mols of triglyceride and 1 mol of glycerol will contain a predominance of diglycerides although some monoglycerides will be present. The diglycerides present in the equilibration mixture as well as monoglycerides which may be present will exist in the ratio of the positional isomers shown above.

When an equilibration mixture is produced from an anhydrous mixture containing a ratio of glyceryl to fatty acid radicals of 3 to 1, the resulting equilibration mixture will contain a major proportion of monoglycerides although diglycerides will also be present and the diglycerides and monoglycerides present in such equilibration mixture will exist as positional isomers in the proportions shown.

The product precipitated will consist substantially of a preponderance of solid symmetrical diglyceride and will contain the portion of the catalyst which is entrapped in the diglyceride during solidification.

When a high boiling ether solvent is employed to induce crystallization it is usually employed in an initial amount of from 5 to 25 weight percent, preferably 10 to 20 weight percent, based on the weight of the equilibration mixture. It has been found advantageous in maintaining crystallization of the symmetrical diglyceride to remove and recover at least a portion of the volatile solvent (e.g. the high boiling liquid ether) from the equilibration mixture. By removing a portion of the solvent, further cooling to obtain additional precipitation is not usually required. If at least a portion of the ether is not removed (and recovered) crystallization tends to be impeded because of the diluted concentrations of the glyceride products remaining unprecipitated in the equilibration mixture. Removal and recovery of from about one-fourth up to three-fourths of the solvent initially added to the equilibration mixture has been found to be effective in maintaining crystallization of the diglyceride from the mixture, thus, permitting the formation of additional symmetrical diglyceride from the residual products in the equilibration mixture.

Reheating of the precipitated symmetrical diglyceride in the presence of the catalyst will result in a mixture of symmetrical and asymmetrical diglycerides and may also result in polyglycerol ester formation. In most instances it is desirable to remove the catalyst from the diglyceride without heating. Such removal can be accomplished in a variety of conventional ways such as, for example, by recrystallizing the diglyceride from a solvent. Suitable crystallization solvents include, for example, short chain hydrocarbon such as benzene, hexane and octane.

As previously noted, the symmetrical diglycerides are intermediates in the synthesis of symmetrical triglycerides which are compatible with cocoa butter. Such symmetrical triglycerides have the formula:

wherein S is a saturated normal aliphatic acyl group, U is an unsaturated normal aliphatic acyl group and S and U contain between 12 and 22 carbon atoms. In the above symmetrical triglycerides, S is preferably derived from stearic or palmitic acid and U is preferably derived from oleic acid.

These symmetrical triglycerides can be readily prepared by reacting an asymmetrical diglyceride (falling within the class hereinbefore described) with an acyl halide in a solvent for both the diglyceride and acyl halide in the presence of a hydrogen chloride acceptor. The acyl halide is preferably one which contains an acyl group which is different from either acyl group of the diglyceride. The hydrogen chloride acceptor is present in an amount sufficient to combine with the hydrogen halide liberated during the reaction. The reaction is carried out at a temperature in the range from about 45° C. to about 75° C. By so proceeding, a crystalline symmetrical triglyceride product of the character above-described crystallizes from the solvent and can be readily separated therefrom.

In the reaction between the symmetrical diglyceride and the acyl halide a wide variety of acyl halides including aliphatic, aromatic, cycloaliphatic, alkaryl halides may be employed. It has been found preferable, in view of the end use desired, to employ unsaturated aliphatic acyl halides having between 12 and 22, more preferably between 16 and 18, carbon atoms in the acyl group such as, for example, oleoyl halides. Advantageous acyl halides are acyl chlorides and acyl bromides wherein the acyl group is as above described.

The reaction is conducted in a solvent such as, for example, an aromatic hydrocarbon solvent or halo-hydrocarbon or an aliphatic hydrocarbon such as benzene. of such solvents hexane is preferred. The hydrogen halide acceptor employed may be any of a number of liquid soluble tertiary amines such as, for example, pyridine, triethylamine, tributylamine, diethylmethylamine, methyldibutylamine, etc.

In a preferred embodiment of the process, a symmetrical diglyceride is reacted with an unsaturated fatty acid chloride such as oleoyl chloride wherein both the diglyceride and the fatty acid chloride are dissolved in dry hexane in the presence of a small excess of an amine such as, for example, pyridine or triethylamine. The tertiary amine should be pure (e.g. should not contain primary and secondary amines) since these amines are reactive with the acyl halide.

The reaction temperautre employed is in the range from about 40° C. to about 75° C. If temperatures below 40° C. are employed, reaction times are unduly long. If temperatures above 75 C. are employed, isomerization of the symmetrical glycerides to asymmetrical glycerides may sometimes occur.

The following specific examples are intended to illustrate the invention and not to limit the scope thereof, parts and percentages being by weight unless otherwise specified.

EXAMPLE 1

Into a 3 liter reaction flask fitted with an electrical stirrer, a gas inlet and outlet and a thermocouple attached to the stirrer, there was charged 1 kilogram of soybean stearine having an iodine value of 3.2 and 52 grams of anhydrous glycerol. The contents of the flask were heated to 115° C. for two hours to remove the residual water from the flask and its contents. Thereafter, the contents of the flask were cooled to 80° C. and there was added, with agitation, 5 grams of sodium methoxide. The temperature was held at 80° C. and stirring was continued for an additional two hours. The reaction mixture which consisted of a dark brown homogeneous mixture was cooled to about 76° C. over 5 hour period while stirring was continued. During this period a solid precipitate appeared which consisted preponderantly of diglyceride. The solids were analyzed and found to contain 86.8 percent diglyceride which consisted of 93.5 percent symmetrical 1,3-distearin and 6.5 percent of 1,2-distearin.

EXAMPLE 2

Into a 1 liter 3-neck reaction flask fitted with a condenser, thermometer, stirrer, dropping funnel and a gas inlet and outlet, there was charged 627 grams of the symmetrical distearin obtained in Example 1, 750 ml. of dry hexane and 150 ml. of pyridine. Thirty (30) grams of oleoyl chloride were added to the mixture, with agitation, to inactivate residual sodium methoxide catalyst. The contents of the flask were heated to 60° C. and 273 grams of additional oleoyl chloride were added over a 30 minute period. Thereafter, while agitation was continued the temperature of the reaction mixture was raised to 75° C. and held for 2 hours, after which an additional 30 grams of oleoyl chloride were charged to the reaction vessel and the contents heated at 75° C. for an additional two hours. Heating was then discontinued and 400 ml. of water and 70 ml. concentrated HCl were added, with agitation, to the reaction flask. Stirring was continued for 5 minutes after which it was discontinued and contents were permitted to separate into an aqueous layer and a non-aqueous solvent (hexane) layer. The non-aqueous layer was washed twice with a water-isopropanol mixture and thereafter washed once with water. The solvent fraction containing the 2-unsaturated 1,3-saturated triglyceride was dried with sodium sulphate and distilled under vacuum to separate the triglyceride from the hexane. A yield of 920 grams of material was obtained. After washing with alkali and bleaching, 824 grams of a white product was obtained. Upon analysis, the product was shown to consist substantially of 75 weight percent of 2-oleo-1,3-distearin and 25 percent of 3-oleo-1,2-distearin along with residual quantities of tristearin and stearo-diolein.

EXAMPLE 3

The procedure of Example 1 was repeated except that tripalmitin was employed in place of the tristearin used in that example. The product obtained consisted substantially of 1,3-dipalmitin which contained minor amounts of 1,2-dipalmitin.

EXAMPLE 4

The procedure of Example 2 was repeated except that the product of Example 3 (e.g. 1,3-dipalmitin) was employed in place of the 1,3-distearin product used in Example 1. After acylation, a product containing about 85 percent of 2-oleo-1,3-dipalmitin and 15 percent 3-oleo-1,2-dipalmitin was obtained.

EXAMPLE 5

The procedure of Example 1 which was repeated except that sodium ethoxide was used as the rearrangement catalyst in place of the sodium methoxide employed in Example 1. A product consisting of a preponderant amount of 1,3-distearin essentially identical to the product of Example 1 was obtained.

EXAMPLE 6

Into the reaction vessel of Example 1, there was charged 1 kilogram of soybean stearine substantially identical to the soybean stearine employed in Example 1. The soybean stearine has been previously dehydrated and was substantially anhydrous. Thereafter, there was charged 52 grams of anhydrous glycerol. The contents of the flask were heated to 80° C. until a clear liquid melt was obtained. Thereafter, 5 grams of sodium methoxide were added to the reactor while the contents of the reactor were agitated and maintained at 80° C. The contents were held at 80° C. while stirring was continued for 2 hours. Thereafter, there was added to the contents of the reaction vessel 150 grams of tetrahydrofuran. The contents of the reaction vessel were cooled to 78° C. after which time a solid reaction product was formed in and precipitated from the liquid reaction mixture. The solid product was removed from the liquid, analyzed and found to consist of 92.4 percent diglyceride which was 90 percent 1,3-distearin and 10 percent 1,2-distearin. Upon acylation of this product, using the procedure described in Example 2, a product substantially identical to that of Example 2 was obtained.

What is claimed is:

1. In a process for glycerolysis of triglycerides, the acyl groups of which are substantially saturated and contain between 12 and 22 carbon atoms, the improvement for directing the glycerolysis to the production of symmetrical glycerides which comprises the steps of:
   (a) liquifying a substantially anhydrous mixture containing from about 1 to about 3 mols of said triglyceride per mol of glycerol by heating said mixture to a temperature not substantially above that which will completely liquify the mixture,
   (b) dispersing from about 0.25 to about 1 weight percent of a low temperature rearrangement catalyst in said liquified mixture,
   (c) agitating said liquified mixture for a time not substantially in excess of about two hours until symmetrical diglyceride is formed by equilibration in the liquid mixture,
   (d) inducing and maintaining precipitation of solid symmetrical diglyceride from said liquified mixture, under agitation conditions, while maintaining the temperature of the mixture between the liquefaction temperature and a temperature above which other equilibration products in said mixture solidify, and
   (e) recovering a solid, substantially pure symmetrical diglyceride.

2. The process of claim 1 wherein the acyl groups of the triglyceride contain between 16 and 18 carbon atoms.

3. The process of claim 1 wherein the anhydrous mixture contains about 2 mols of triglyceride per mol of glycerol.

4. The process of claim 1 wherein the low temperature rearrangement catalyst is a metal lower alkoxide.

5. The process of claim 1 wherein precipitation of the solid symmetrical diglyceride is induced by seeding the liquified mixture with a solid symmetrical diglyceride.

6. The process of claim 1 wherein the precipitation of solid symmetrical diglyceride is induced by dispersing in said equilibration liquid mixture from about 10 to about 20 weight percent of a volatile organic liquid which is a solvent for all of the equilibration products in said mixture and recovering at least a portion of said volatile solvent by evaporation.

7. The process as in claim 6 wherein said solvent is removed after crystallization is initiated and during further crystallization of said diglyceride.

References Cited

UNITED STATES PATENTS

| | | | |
|---|---|---|---|
| 2,442,532 | 6/1948 | Eckey | 260—410.7 |
| 2,626,952 | 1/1953 | Lange et al. | 260—410.7 |
| 3,312,724 | 4/1967 | Harwood | 260—410.7 |

OTHER REFERENCES

Conant et al.: The Chemistry of Organic Compounds, 1947, p. 92.

LORRAINE A. WEINBERGER, Primary Examiner

R. S. WEISSBERG, Assistant Examiner